United States Patent
Deng

(10) Patent No.: US 12,418,841 B2
(45) Date of Patent: Sep. 16, 2025

(54) CONFIGURATION METHOD AND APPARATUS FOR CONDITIONAL PSCELL CHANGE IN DUAL CONNECTIVITY, STORAGE MEDIUM, BASE STATION, AND TERMINAL

(71) Applicant: SPREADTRUM COMMUNICATIONS (SHANGHAI) CO., LTD., Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 356 days.

(21) Appl. No.: 18/029,266

(22) PCT Filed: Aug. 27, 2021

(86) PCT No.: PCT/CN2021/114897
§ 371 (c)(1),
(2) Date: Mar. 29, 2023

(87) PCT Pub. No.: WO2022/068485
PCT Pub. Date: Apr. 7, 2022

(65) Prior Publication Data
US 2023/0370909 A1    Nov. 16, 2023

(30) Foreign Application Priority Data
Sep. 29, 2020    (CN) .......................... 202011050152.4

(51) Int. Cl.
*H04W 36/00*    (2009.01)
(52) U.S. Cl.
CPC .................. *H04W 36/0069* (2018.08); *H04W 36/00692* (2023.05); *H04W 36/00837* (2018.08)

(58) Field of Classification Search
CPC ....... H04W 36/0069; H04W 36/00692; H04W 36/00837; H04W 36/08; H04W 36/24;
(Continued)

(56) References Cited

U.S. PATENT DOCUMENTS 10,448,289 B2 * 10/2019 Tenny ............... H04W 36/0038
2021/0092655 A1 * 3/2021 Zhang ............... H04W 36/0094
(Continued)

FOREIGN PATENT DOCUMENTS

| CN | 110198553 A | 9/2019 |
| CN | 110278587 A | 9/2019 |

(Continued)

OTHER PUBLICATIONS

"NR Mobility Enhancements", 3GPP Draft; RP-201273, vol. TSG RAN, No. Electronic Meeting; Jun. 29, 2020-Jul. 3, 2020; Jun. 30, 2020, XP052338467, Retrieved from the Internet, 38 pages.
(Continued)

*Primary Examiner* — Mohamed A Kamara
(74) *Attorney, Agent, or Firm* — CANTOR COLBURN LLP

(57) ABSTRACT

A configuration method and apparatus for Conditional Primary Secondary Cell Group Cell (PSCell) Change (CPC) in dual connectivity, a storage medium, a base station, and a terminal are provided. The method includes: for configuring the CPC for a User Equipment (UE), determining whether a configuration threshold has been received from a master base station, wherein the configuration threshold is a number threshold of CPCs configurable by a secondary base station; and determining a number of the CPCs configurable by the secondary base station based on the number threshold, in response to the configuration threshold having been received from the master base station, wherein the number of the
(Continued)

CPCs configurable by the secondary base station is less than or equal to the configuration threshold.

20 Claims, 5 Drawing Sheets

(58) Field of Classification Search
CPC ............... H04W 36/36; H04W 36/362; H04W 76/15; H04W 76/30
See application file for complete search history.

(56) References Cited

U.S. PATENT DOCUMENTS

| | | | |
|---|---|---|---|
| 2021/0099927 A1 | 4/2021 | Wu | |
| 2021/0136638 A1 | 5/2021 | Paladugu et al. | |
| 2022/0007254 A1 | 1/2022 | Da Silva et al. | |
| 2022/0053397 A1* | 2/2022 | Huang | H04W 36/08 |
| 2022/0240135 A1 | 7/2022 | Wu | |
| 2023/0007552 A1* | 1/2023 | Sun | H04W 76/15 |
| 2023/0035119 A1 | 2/2023 | Yang et al. | |

FOREIGN PATENT DOCUMENTS

| | | |
|---|---|---|
| CN | 111901839 A | 11/2020 |
| CN | 112788676 A | 5/2021 |
| CN | 113170368 A | 7/2021 |
| WO | 2020145736 A1 | 7/2020 |

OTHER PUBLICATIONS

EPO Extended European Search Report for corresponding EP Application No. 21874146.0; Dated Feb. 27, 2024; 16 pages.
Spreadtrum Communications "CPC configuration number restriction" 3GPP Draft; R2-2009158, TSG-RAN Meeting #112 , vol. RAN WG2, No. electronic; Nov. 2, 2020-Nov. 13, 2020, Oct. 23, 2020, XP051942178, Retrieved from the Internet, 2 pages.
ZTE et al. "(TP for TP for E-UTRA_Mob-enh BL CR for TS 36.423) Introduction of Maximum Number of Candidate PScells Allowed by MN", 3GPP Draft; R3-201891, vol. RAN WG3, No. Online Meeting; Apr. 20, 2020-Apr. 30, 2020; Apr. 9, 2020; XP051870550, Retrieved from the Internet, 25 pages.
CATT, "Introduction of Conditional PSCell Change for intra-SN without MN involvement", 3GPP TSG-RAN2 Meeting #110 electronic, R2-2006379, Jun. 1-12, 2020, 21 pages.
International Search Report for corresponding International Application No. PCT/CN2021/114897; Mailing Date, Nov. 18, 2021.
ZTE Corporation et al., "Discussion on conditional PSCell addition/change", 3GPP TSG-RAN WG2 Meeting #111 electronic, R2-2006901, Aug. 17-28, 2020, 11 pages.
ZTE et al., "(TP for NR_Mob_enh BL CR for TS 37.340) Further Discussion of Parallel CHO and CPC Simultaneous Operation", 3GPP TSG-RAN3 Meeting #107bis-e, R3-201890, Apr. 20-30, 2020, 3 pages.

* cited by examiner

CONFIGURATION METHOD AND APPARATUS FOR CONDITIONAL PSCELL CHANGE IN DUAL CONNECTIVITY, STORAGE MEDIUM, BASE STATION, AND TERMINAL

CROSS-REFERENCE TO RELATED APPLICATIONS

This is the U.S. national stage of application No. PCT/CN2021/114897, filed on Aug. 27, 2021. Priority under 35 U.S.C. § 119(a) and 35 U.S.C. § 365(b) is claimed from Chinese Application No. 202011050152.4, filed Sep. 29, 2020, the disclosure of which is also incorporated herein by reference.

TECHNICAL FIELD

The present disclosure generally relates to communication technology field, and more particularly, to a configuration method and apparatus for Conditional Primary Secondary Cell Group Cell (PSCell) Change (CPC) in dual connectivity, a storage medium, a base station, and a terminal.

BACKGROUND

Based on discussion, 3GPP standards will introduce a Conditional Handover (CHO) mechanism. Referring to FIG. 1, FIG. 1 is a diagram of CHO in existing techniques. A source cell (i.e., a source base station or a Source Node) to which a User Equipment (UE) is currently connected transmits a handover request (e.g., a CHO request as shown in FIG. 1) to a potential target cell (also called a potential/candidate target base station or a Potential/Candidate Target Node). After receiving acknowledgement (CHO request ACK) from the potential target cell, the source cell transmits to the UE a handover command which includes a handover execution condition (CHO parameters as shown in FIG. 1). For example, the handover execution condition may be that signal quality of the potential target cell is higher than signal quality of a serving cell by a predetermined offset, under which cell handover and the like may be performed.

After receiving the handover command, the UE determines whether the potential target cell meets the handover execution condition, and if so, the UE performs cell handover. Specifically, the UE uses configuration parameters of the potential target cell (a target cell for the handover at this time) contained in the handover command to synchronize to the target cell and perform a Random Access (RA) procedure (a step shown with a dotted line in FIG. 1). After completing the RA procedure in the target cell, the UE transmits a handover completion signaling indicating that Radio Resource Control (RRC) reconfiguration is complete. Accordingly, the UE hands over to the target cell. After the UE accesses the target cell, the target base station performs path switch, and notifies the source base station to release context of the UE.

In addition, if the UE determines that the handover execution condition is not met, the UE continues to maintain an RRC connection with the source base station. Optionally, the source base station may configure multiple potential target cells and corresponding handover execution conditions (not shown in FIG. 1).

Following receiving the handover command and prior to handing over to the target cell, the UE continues to maintain the RRC connection with the source base station. During this period, the UE continues to perform measurement according to measurement configuration configured by the source base station and reports neighboring cells that meet a reporting condition to the source base station. The source base station may adjust the handover execution condition, the potential target cell, etc. at any time, or transmit a handover command for unconditional handover according to actual conditions. Therefore, the source base station needs to know environment changes of a channel where the UE is located in real time for facilitating making timely decisions, so as to avoid multiple consecutive cell handovers due to handover of the UE to an inappropriate neighboring cell, which ensures a data transmission rate and user experience. The handover of the UE to an inappropriate neighboring cell means a handover of the UE to a neighboring cell that is not strongest on a particular frequency. The handover to a non-strongest neighboring cell may bring great interference to uplink and downlink signal transmission of the UE and cause the base station to make a decision of handover again.

The above CHO mechanism can be applied to PSCell handover change in dual connectivity, which is called a Conditional PSCell Change (CPC). In dual connectivity, the UE maintains connection with two base stations, that is, Master Node (MN) and Secondary Node (SN) and can perform signaling and data interaction with the two base stations simultaneously.

When the CHO mechanism is introduced into PSCell change, configuration parameters of the CPC can be configured by the MN or SN for the UE. A CPC configuration may include an identifier of a potential PSCell, and radio parameters and a PSCell change condition configured for the UE by the potential PSCell. There may be multiple potential PSCells. A source PSCell may transmit a request to one or more potential PSCells, each potential PSCell makes configuration, and the source PSCell transmits the configuration to the UE. The change condition is that, for example, signal quality of the potential PSCell exceeds a predetermined threshold, or the signal quality of the potential PSCell exceeds signal quality of the source PSCell by a preset offset, under which the PSCell change is performed.

SUMMARY

Embodiments of the present disclosure may ensure that a total number of CPCs configured by an MN and an SN for a UE does not exceed capacity of the UE, so as to guarantee mobility performance.

In an embodiment of the present disclosure, a configuration method for CPC in dual connectivity is provided, including: for configuring the CPC for a UE, determining whether a configuration threshold has been received from a master base station, wherein the configuration threshold is a number threshold of CPCs configurable by a secondary base station; and determining a number of CPCs configurable by the secondary base station based on the number threshold, in response to the configuration threshold having been received from the master base station, wherein the number of the CPCs configurable by the secondary base station is less than or equal to the configuration threshold.

In an embodiment of the present disclosure, a configuration method for CPC in dual connectivity is provided, including: transmitting a configuration threshold to a secondary base station, to make the secondary base station determine a number of CPCs configurable by the secondary base station based on the configuration threshold while configuring the CPC for a UE; wherein the configuration threshold is a number threshold of CPCs configurable by the secondary base station, and the number of the CPCs configurable by the secondary base station is less than or equal to the configuration threshold.

In an embodiment of the present disclosure, a base station including a memory and a processor is provided, wherein the memory has computer instructions stored therein, and when the processor executes the computer instructions, the above method is performed.

DETAILED DESCRIPTION

As described in the background, when a CHO mechanism is introduced into PSCell change, CPC can be configured by an MN or an SN for a UE, thereby causing too many configured CPCs which exceeds capacity of the UE.

Figure 1:
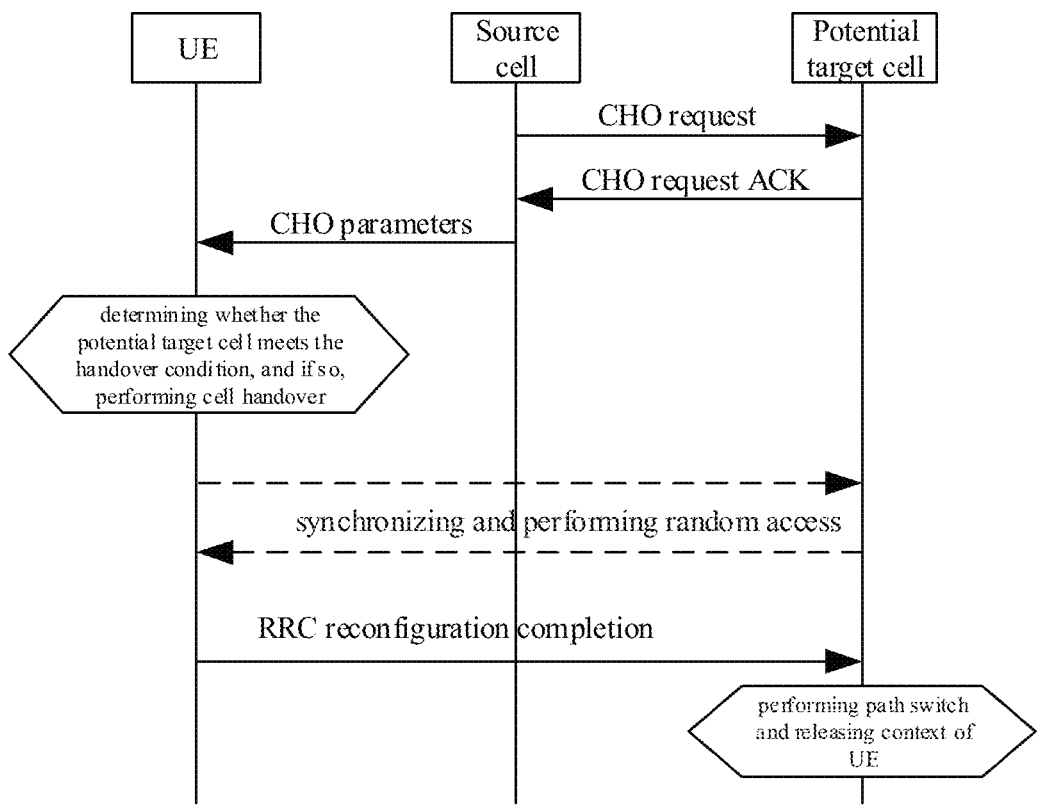
FIG. 1 is a diagram of CHO in existing techniques.
Figure 2:
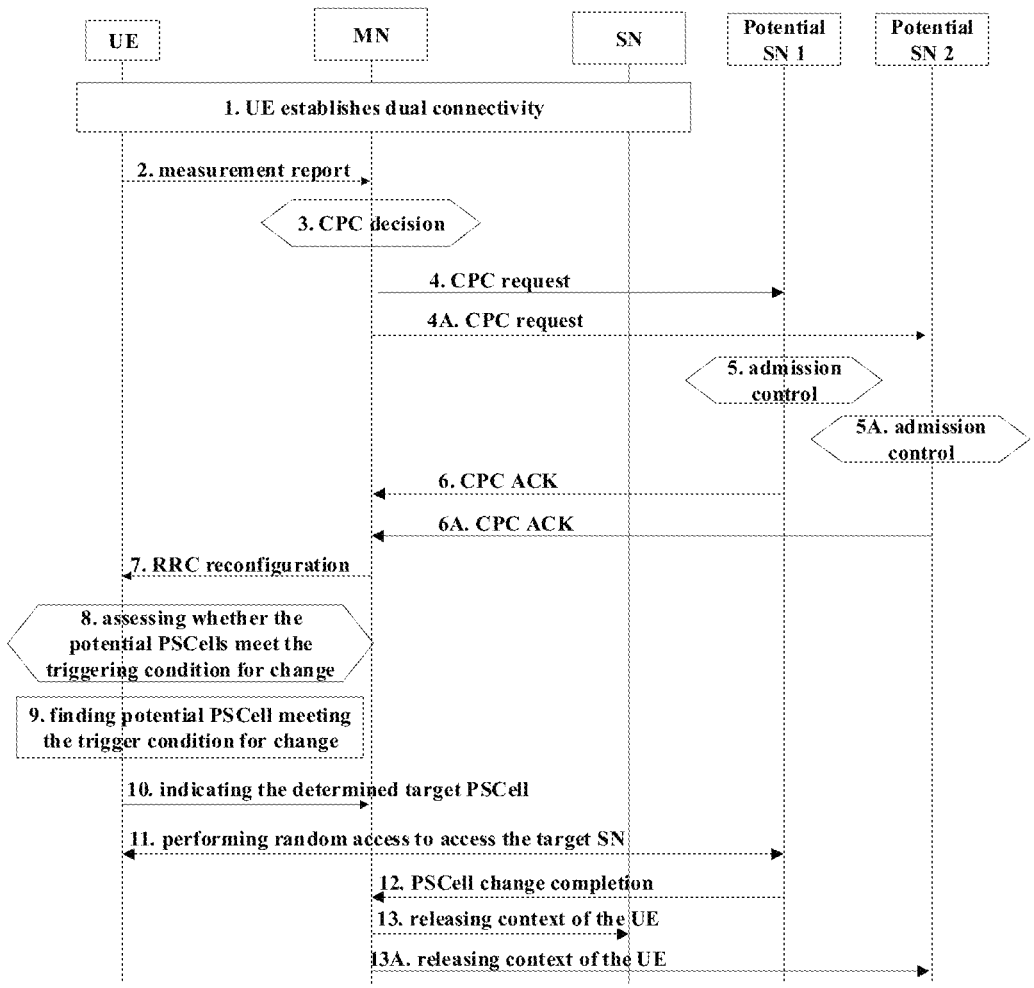
FIG. 2 is a flow chart of a conditional PSCell handover in dual connectivity in the existing techniques.

Specifically, referring to FIG. 2, FIG. 2 is a flow chart of a conditional PSCell handover in dual connectivity in the existing techniques, which is a process of an MN configuring CPC for a UE. Specific steps are described in detail as follows.

In step 1, the UE establishes dual connectivity.

In Release 15 (R15), there is Multi-RAT Dual Connectivity (MR-DC). It can be seen in practical applications that there may be different types of dual connectivity, such as Long Term Evolution (LTE) dual connectivity, LTE and New Radio (NR) dual connectivity, and NR dual connectivity. The LTE and NR dual connectivity may include EN-DC (an LTE base station serves as the MN of the UE, and an NR base station serves as the SN of the UE), NE-DC (an NR base station serves as the MN of the UE, and an LTE base station serves as the SN of the UE), or NGEN-DC (an LTE base station connected to a 5G core network serves as the MN of the UE, and an NR base station serves as the SN of the UE). A process for establishing dual connectivity is an existing technique and is not described in detail here. More details can be referred to a 3GPP standard TS37.340.

In step 2, the UE performs measurement according to measurement configuration, and reports a measurement report to a network in response to meeting a reporting condition.

In specific implementation, the UE may perform measurement based on a measurement task configured by the MN, and then report the measurement report to the MN in response to a neighboring cell or a serving cell meeting the reporting condition, where the report includes an identity and signal quality of the neighboring cell and/or the serving cell that meets the reporting condition, that is, the report includes the identity and signal quality of the neighboring cell that meets the reporting condition, or the identity and signal quality of the serving cell that meets the reporting condition, or the identity and signal quality of the neighboring cell and the identity and signal quality of the serving cell.

In step 3, the MN determines to perform CPC based on the measurement report.

In steps 4 and 4A, the MN selects one or more potential PSCells, and transmits a CPC request to a base station to which each potential PSCell belongs, i.e., a potential SN, where the CPC request includes radio parameters configured for the UE by the MN, particularly including configuration restriction information (ConfigRestrictInfoSCG) of the SN set by the MN, and further including UE capability information and radio parameters (sourceConfigSCG) configured by a source SN for the UE. The CPC request further includes a trigger condition or an execution condition for PSCell change and an identity of the potential PSCell. The UE determines whether the potential PSCell meets a change condition, and if so, the UE performs PSCell change or SN change. The trigger condition may be signal quality of the potential PSCell being higher than signal quality of a source PSCell by a preset offset.

It should be noted that the CPC request may have other names, such as an SN conditional change request. The UE in dual connectivity can configure carrier aggregation at the SN, thus, the CPC request is not limited to the change of PSCell, but may also include change of other secondary cells, that is, the potential SN may configure for the UE merely parameters of the potential PSCell, or parameters of the potential PSCell and parameters of one or more secondary cells.

When selecting multiple potential PSCells, the MN may transmit the CPC request to multiple potential SNs in parallel or successively.

In steps 5 and 5A, a potential SN 1 and a potential SN 2 perform admission control according to a cell load after receiving the CPC request and accept the CPC request if resources permit.

In steps 6 and 6A, after accepting the CPC request, the potential SN 1 and the potential SN 2 allocate necessary radio resources for the UE, such as random access resources, and return a CPC acknowledgement to the MN, wherein the CPC acknowledgement includes radio resources configured for the UE, i.e., SCG config.

In step 7, the MN transmits a CPC signaling to the UE. The MN may transmit multiple CPC information at one time through one RRC reconfiguration signaling, or successively through multiple RRC reconfiguration signalings. A piece of CPC information (that is, a CPC configuration) includes an identity of one potential PSCell, a trigger condition for PSCell change, radio resources configured by a potential SN for the UE, and the like. Different potential PSCells may have different or the same triggering condition for change.

In step 8, the UE receives the CPC information, and starts to assess whether the potential PSCells meet the triggering condition for change.

In step 9, the UE finds that at least one potential PSCell meets the trigger condition for change. If there are multiple potential PSCells that meet the trigger condition for PSCell change, the UE may select the potential PSCell with highest signal quality as a target PSCell for change, or randomly select a potential PSCell as the target PSCell for change.

In step 10, the UE indicates to the MN the determined target PSCell, i.e., the target PSCell to be accessed by the UE. The UE may indicate to the MN the determined target PSCell, for example, an identity of the target PSCell, through RRC signaling. After receiving the indication information, the MN may forward data of data radio bearer established by the UE to a target SN in advance, so that the UE can immediately receive downlink data from the target SN after accessing the target SN.

In step 11, the UE performs random access through a radio resource configured for the UE by the target SN (that is, radio parameters configured for the UE by the target SN in CPC configuration corresponding to the target PSCell) to access the target SN.

The steps 10 and 11 may be performed in parallel. Step 10 is optional.

In step 12, after the UE successfully accesses the target SN, the target SN transmits a PSCell change completion message to the MN.

In steps 13 and 13A, the MN notifies the source SN and other potential SNs to release context of the UE.

For the UE in dual connectivity, the SN may also configure CPC for the UE. From above, in the existing PSCell CHO mechanism, when both the MN and the SN configure CPC for the UE, a number of CPC bits associated with each potential PSCell may be relatively large. If too many CPCs are configured on both sides (that is, there are too many potential PSCells), it is prone to exceed capacity of the UE, thereby exceeding processing capability of the UE.

Embodiments of the present disclosure provide a configuration method for CPC in dual connectivity, including: for configuring the CPC for a UE, determining whether a configuration threshold has been received from a master base station, wherein the configuration threshold is a number threshold of CPCs configurable by a secondary base station; and determining a number of CPCs configurable by the secondary base station based on the number threshold, in response to the configuration threshold having been received from the master base station, wherein the number of the CPCs configurable by the secondary base station is less than or equal to the configuration threshold.

Therefore, a total number of CPCs configured by an MN and an SN for the UE does not exceed capacity of the UE in dual connectivity.

In order to clarify the objects, characteristics and advantages of the disclosure, embodiments of present disclosure will be described in detail in conjunction with accompanying drawings.

Figure 3:
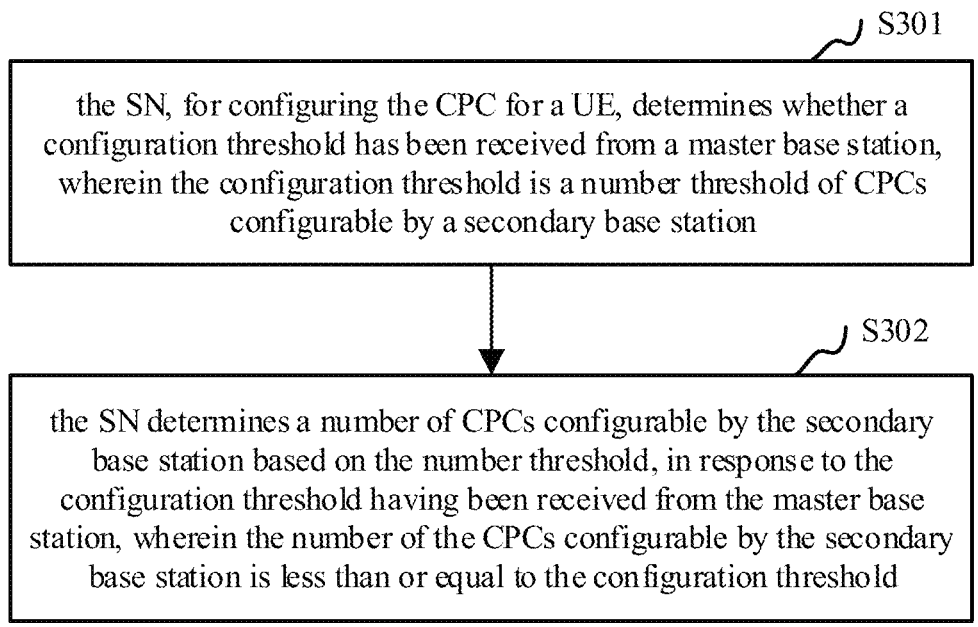
FIG. 3 is a flow chart of a configuration method for CPC in dual connectivity according to an embodiment.

Referring to FIG. 3, FIG. 3 is a flow chart of a configuration method for CPC in dual connectivity according to an embodiment. The method is performed by an SN and includes S301 and S302.

In S301, the SN, for configuring the CPC for a UE, determines whether a configuration threshold has been received from a master base station, wherein the configuration threshold is a number threshold of CPCs configurable by a secondary base station.

In S302, the SN determines a number of CPCs configurable by the secondary base station based on the number threshold, in response to the configuration threshold having been received from the master base station, wherein the number of the CPCs configurable by the secondary base station is less than or equal to the configuration threshold.

The CPCs (also called CPC configuration) in the embodiment include configuration parameters of the potential PSCells, which may include configuration parameters of layer 1, configuration parameters of layer 2, configuration parameters of layer 3, and corresponding PSCell change conditions, etc. Optionally, each CPC corresponds to one potential PSCell.

The number of the CPCs configurable by the SN cannot exceed a certain threshold which may be configured by an MN, i.e., the configuration threshold transmitted from the MN to the SN. If the MN sets the configuration threshold for the SN, the number of the CPCs configurable by the SN is less than or equal to the configuration threshold.

Optionally, the method further includes receiving the configuration threshold from the MN through an SN addition request or an SN modification request.

Optionally, when the MN configures a Secondary Cell Group (SCG) for the UE, that is, when configuring secondary cells for the UE, the MN may transmit the configuration threshold to the SN or transmit to the SN the number threshold of the CPCs configurable by the SN when SCG parameters need to be modified.

Specifically, the configuration threshold can be transmitted from the MN to the SN in following two cases.

In case 1, continuing to referring to FIG. 2, in step 1 of FIG. 2, during a process for establishing dual connectivity by the UE, the MN transmits an SN addition request to the SN, so that the SN configures radio parameters for the UE to make the UE access the SN to establish dual connectivity. In step 1 of FIG. 2, the MN transmits the configuration threshold to the SN through the SN addition request.

In case 2, after dual connectivity is established among the UE and the MN and SN, if SCG configuration parameters change, the MN may transmit the configuration threshold to the SN based on the SN modification request.

It should be noted that, triggering cases for the configuration threshold being transmitted from the MN to the SN include but are not limited to the above cases.

In the above embodiments, when the SN configures CPC for the UE, the total number of CPCs configurable by the SN does not exceed a certain threshold, so that a reasonable number of CPCs (or CPC configurations) are configured for the UE, which avoids a processing error of the UE and communication interruption caused by exceeding processing capability of the UE. After being configured with the CPCs, the UE may assess a potential PSCell, and perform PSCell change when an execution condition of the potential PSCell is met, which meets mobility requirements of the UE.

Optionally, the configuration threshold is the number threshold of CPCs without MN involvement and/or the number threshold of the CPCs with MN involvement.

Further, the number threshold of CPCs without MN involvement may be a number threshold of CPCs without MN involvement intra-SN and/or a number threshold of CPCs without MN involvement inter-SN (i.e., between different SNs).

CPCs involving different frequency band combinations or feature sets are called MN involvement CPCs. For the UE in dual connectivity, radio parameters currently configured by a current SN for the UE include a frequency band combination and a feature set configured for the UE by the current SN. Radio parameters (i.e., the CPC configuration) configured for the UE by the potential SN also includes frequency band combinations and feature sets. The frequency band combination represents a combination of multiple bandwidths, and the feature set represents a set of feature parameters of the UE on each bandwidth. If the frequency band combination or the feature set in the CPC is different from the frequency band combination or the feature set configured by the source SN for the UE, it is called MN involved CPC configuration, and if the frequency band combination and feature set in the CPC are the same as the frequency band combination and feature set configured for the UE by the source SN, it is called CPC configuration without MN involvement.

For intra-SN CPC configuration without MN involvement, the SN selects a serving cell under its jurisdiction as a potential PSCell for the UE, and the potential PSCell configures radio parameters for the UE. In this case, a frequency band combination and a feature set in the radio parameters are the same as a frequency band combination and a feature set configured by a current PSCell, and the SN can directly transmit the CPC configuration to the UE.

As the CPC configuration with MN involvement generally needs to be transmitted by the MN to the UE, after setting a number of CPC configuration without MN involvement for the SN, the MN may control a number of CPC configuration with MN involvement to ensure that the total number of the CPCs configured for the UE does not exceed the capacity of the UE.

For example, the MN sets that the SN can configure at most 3 CPCs without MN involvement (that is, the configuration threshold is 3). If the standard specifies that the UE can have a maximum of 8 CPC configurations, the MN can configure at most 5 CPCs for the UE, i.e., a maximum number of CPCs with MN involvement is 5. Alternatively, the MN sets that the SN can configure at most 3 CPCs without MN involvement and 2 CPCs with MN involvement. After the SN configures 5 CPCs for the UE, assuming that the UE can configure a maximum of 8 CPCs, the MN may further configure for the UE a maximum of 3 CPCs all of which are MN involved CPCs or CPCs with MN involvement.

In some embodiments, continuing to refer to FIG. 2, after determining in S201 whether the configuration threshold has been received from the MN, the method further includes: determining a maximum number of CPCs configurable by the SN based on a first preset threshold, in response to the configuration threshold having not been received from the master base station.

If the SN has not received the configuration threshold from the MN, the first preset threshold set according to standard specifications, high-layer signaling configuration or other preset rules serves as the number threshold of CPCs configurable by the SN for the UE. That is, the number of CPCs configured by the SN for the UE does not exceed the first preset threshold. For example, the first preset threshold is 8, that is, if the MN does not set the configuration threshold for the SN, the SN can configure a maximum of 8 CPCs for the UE.

Optionally, the method further includes: transmitting a CPC number threshold configuration request or a CPC number threshold modification request to the MN, to make the MN transmit the configuration threshold to the SN or update the configuration threshold.

The CPC number threshold configuration request is a request sent by the SN to the MN to request for the configuration threshold. Optionally, if the SN does not receive the configuration threshold from the MN, the SN may transmit the CPC number threshold configuration request to the MN. Alternatively, before the SN is about to configure the CPC for the UE, the SN may transmit the CPC number threshold configuration request to the MN. That is, if the MN does not set the configuration threshold for the SN, the SN configures CPCs for the UE based on the first preset threshold; or, if the MN does not set the configuration threshold for the SN, the SN cannot configure CPCs for the UE. If it is necessary to configure the CPCs, the SN may transmit the CPC number threshold configuration request to the MN to trigger setting of the MN.

The CPC number threshold modification request is a request sent by the SN to the MN to request for modification of the configuration threshold. Optionally, before the SN configures the CPC for the UE, the SN may transmit the CPC number threshold modification request to the MN. Alternatively, if the SN finds that the configuration threshold received from the MN is unreasonable (too large or too small), the SN may transmit to the MN the CPC number threshold modification request.

In the above embodiments, the SN may transmit the CPC number threshold configuration request or the CPC number threshold modification request to the MN, to make the MN transmit or update the configuration threshold. Besides, even if the MN does not transmit the configuration threshold to the SN, the SN can configure the CPC for the UE according to the first preset threshold.

Figure 4:
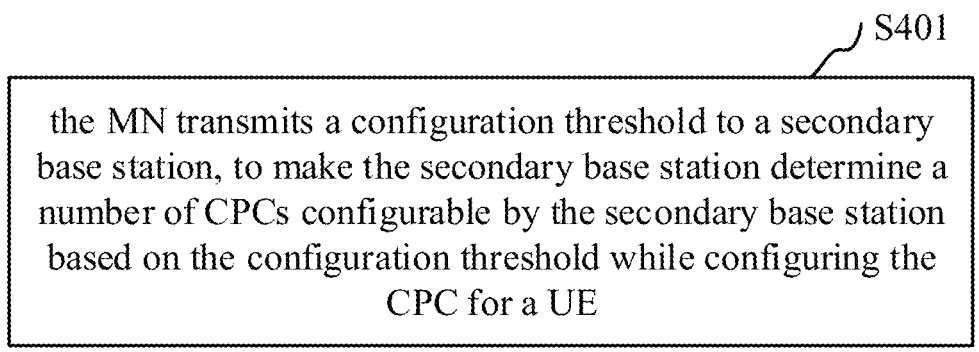
FIG. 4 is a flow chart of a configuration method for CPC in dual connectivity according to an embodiment.

Referring to FIG. 4, FIG. 4 is a flow chart of a configuration method for CPC in dual connectivity according to an embodiment. The method is performed by an MN and includes S401.

In S401, the MN transmits a configuration threshold to a secondary base station, to make the secondary base station determine a number of CPCs configurable by the secondary base station based on the configuration threshold while configuring the CPC for a UE.

The configuration threshold is a number threshold of CPCs configurable by the secondary base station, and the number of the CPCs configurable by the secondary base station is less than or equal to the configuration threshold.

Optionally, the configuration threshold is the number threshold of CPCs without master base station involvement and/or the number threshold of CPCs with master base station involvement.

Optionally, the method further includes transmitting the configuration threshold to the secondary base station through a secondary base station addition request or a secondary base station modification request.

Optionally, the method further includes receiving a CPC number threshold configuration request or a CPC number threshold modification request from the secondary base station, and transmitting the configuration threshold to the secondary base station or updating the configuration threshold.

More details of working principles and working modes of the method as shown in FIG. 4 can be referred to related descriptions of the MN in the method as shown in FIG. 3 and are not repeated here.

Figure 5:
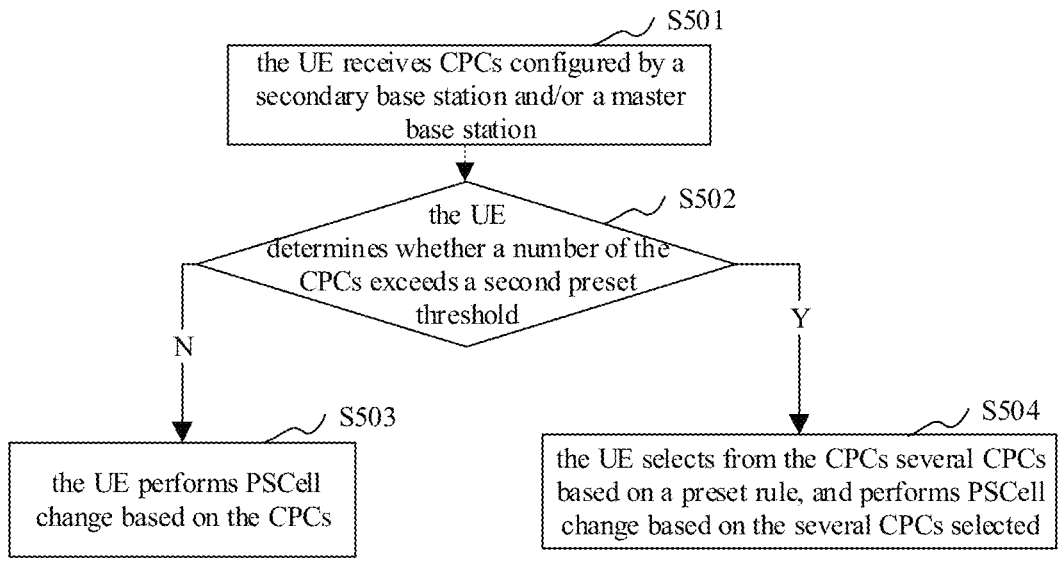
FIG. 5 is a flow chart of a configuration method for CPC in dual connectivity according to an embodiment.

Referring to FIG. 5, FIG. 5 is a flow chart of a configuration method for CPC in dual connectivity according to an embodiment. The method is performed by a UE and includes S501 to S504.

In S501, the UE receives CPCs configured by a secondary base station and/or a master base station.

In S502, the UE determines whether a number of the CPCs exceeds a second preset threshold.

In response to the number of the CPCs not exceeding the second preset threshold, i.e., a determination result of S502 being negative, S503 is performed. In S503, the UE performs PSCell change based on the CPCs.

In response to the number of the CPCs exceeding the second preset threshold, i.e., the determination result of S502 being positive, S504 is performed. In S504, the UE selects from the CPCs several CPCs based on a preset rule and performs PSCell change based on the several CPCs selected.

A number of CPCs configured by the secondary base station is less than or equal to a configuration threshold, wherein the configuration threshold is a number threshold of CPCs configurable by the secondary base station and is transmitted by the master base station to the secondary base station.

When performing PSCell change based on the CPCs or the selected CPCs, the UE assesses whether multiple potential PSCells corresponding to the CPCs or the selected CPCs meet a change trigger condition, and if so, performs PSCell change.

For the method as shown in FIG. 5, the number of CPCs configured by the SN for the UE may not be limited by the threshold. The MN may not transmit the number threshold of CPCs to the SN, and the UE itself selects the number of CPCs capable of being processed according to processing capability.

Optionally, the configuration threshold is the number threshold of CPCs without master base station involvement and/or the number threshold of CPCs with master base station involvement.

Optionally, based on that the secondary base station does not receive the configuration threshold from the master base station, the number of the CPCs configured by the secondary base station is less than or equal to a first preset threshold.

Optionally, the preset rule includes preferentially selecting several CPCs last configured, preferentially applying the CPCs configured by the master base station, preferentially applying the CPCs configured by the secondary base station, or preferentially applying the CPCs configured by the secondary base station without master base station involvement.

In dual connectivity, both the MN and the SN can configure CPCs for the UE, and the number of all CPCs configured for the UE on both sides, i.e., the total number of CPCs, should not exceed the capacity of the UE, which is represented by the second preset threshold. Optionally, a value of the second preset threshold may be defined by a standard or determined according to the processing capability of the UE, and the second preset threshold may be the same as or different from the first preset threshold.

In response to the number of total CPCs exceeding the second preset threshold, the UE may select from the total CPCs merely several CPCs to apply based on a certain rule (i.e., the preset rule).

The preset rule may be defined by a standard, or determined according to high-layer signaling, or determined according to the processing capability and requirements of the UE.

For example, the UE receives the CPC configurations from both sides, and after receiving the CPC configuration, the UE preferentially applies several (which may be the second preset threshold) CPCs last configured, i.e., the latest configured CPCs.

Alternatively, the UE may apply the first several CPCs.

For another example, after receiving the CPCs configured by both sides, the UE preferentially applies the CPCs configured by the MN, or preferentially applies the CPCs configured by the SN, or preferentially applies the CPCs without MN involvement, as long as the number of CPCs applied by the UE does not exceed the second preset threshold.

Optionally, following selecting from the CPCs several CPCs based on a preset rule, the method further includes: deleting configuration of CPCs that are not selected.

That is, unselected CPCs may be deleted to release storage space and improve the processing capability of the UE.

Optionally, if the UE coordinates the number of the CPCs configurable through the second preset threshold, the MN and the SN do not need to negotiate numbers of CPCs configured for the UE.

More details of working principles and working modes of the method as shown in FIG. 5 can be referred to related descriptions of the method as shown in FIG. 3 and are not repeated here.

Figure 6:
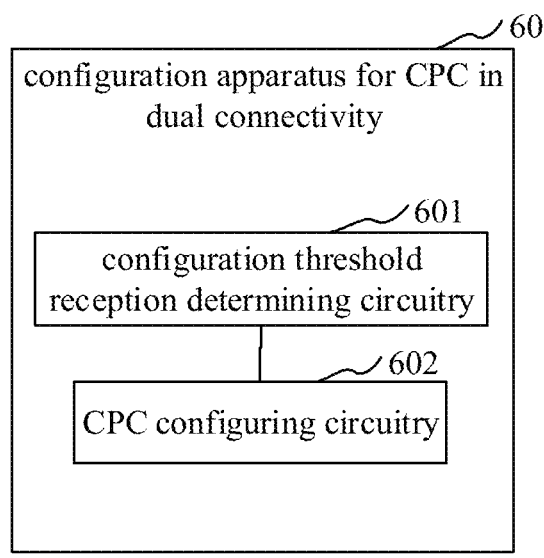
FIG. 6 is a structural diagram of a configuration apparatus for CPC in dual connectivity according to an embodiment.

Referring to FIG. 6, FIG. 6 is a structural diagram of a configuration apparatus 60 for CPC in dual connectivity according to an embodiment. The apparatus 60 includes a configuration threshold reception determining circuitry 601 and a CPC configuring circuitry 602.

The configuration threshold reception determining circuitry 601 is configured to: for configuring the CPC for a UE, determine whether a configuration threshold has been received from a master base station, wherein the configuration threshold is a number threshold of CPCs configurable by a secondary base station.

The CPC configuring circuitry 602 is configured to: determine a number of CPCs configurable by the secondary base station based on the number threshold, in response to the configuration threshold having been received from the master base station, wherein the number of the CPCs configurable by the secondary base station is less than or equal to the configuration threshold.

More details of working principles and working modes of the apparatus 60 as shown in FIG. 6 can be referred to related descriptions of the method as shown in FIG. 3 and are not repeated here.

In some embodiments, the apparatus 60 may correspond to a chip with a communication function in an SN, or to a chip with a data processing function, such as a System-On-Chip (SOC) or a baseband chip, or to a chip module including a chip with a communication function in the SN, or to a chip module including a chip with a data processing function, or to the SN.

Figure 7:
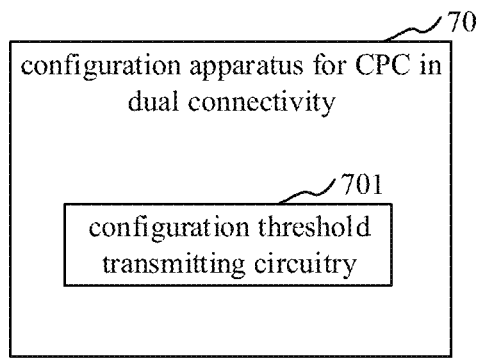
FIG. 7 is a structural diagram of a configuration apparatus for CPC in dual connectivity according to an embodiment.

Referring to FIG. 7, FIG. 7 is a structural diagram of a configuration apparatus 70 for CPC in dual connectivity according to an embodiment. The apparatus 70 includes a configuration threshold transmitting circuitry 701.

The configuration threshold transmitting circuitry 701 is configured to: transmit a configuration threshold to a secondary base station, to make the secondary base station determine a number of CPCs configurable by the secondary base station based on the configuration threshold while configuring the CPC for a UE.

The configuration threshold is a number threshold of CPCs configurable by the secondary base station, and the number of the CPCs configurable by the secondary base station is less than or equal to the configuration threshold.

More details of working principles and working modes of the apparatus 70 as shown in FIG. 7 can be referred to related descriptions of the method as shown in FIG. 4 and are not repeated here.

In some embodiments, the apparatus 70 may correspond to a chip with a communication function in an MN, or to a chip with a data processing function, such as an SOC or a baseband chip, or to a chip module including a chip with a communication function in the MN, or to a chip module including a chip with a data processing function, or to the MN.

Figure 8:
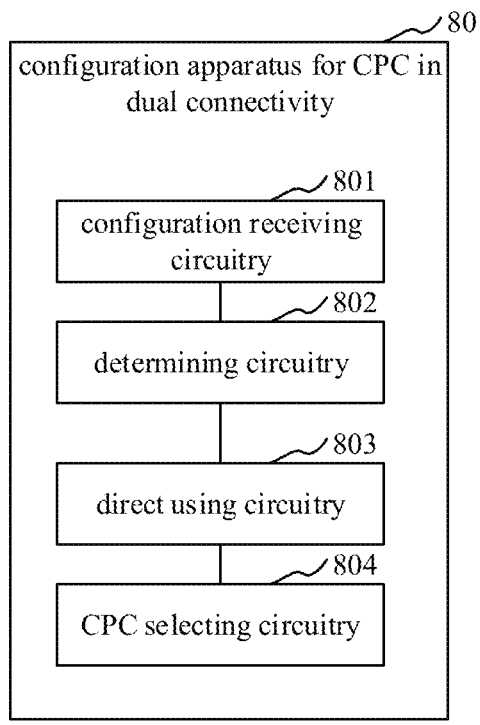
FIG. 8 is a structural diagram of a configuration apparatus for CPC in dual connectivity according to an embodiment.

Referring to FIG. 8, FIG. 8 is a structural diagram of a configuration apparatus 80 for CPC in dual connectivity according to an embodiment. The apparatus 80 includes a configuration receiving circuitry 801, a determining circuitry 802, a direct using circuitry 803 and a CPC selecting circuitry 804.

The configuration receiving circuitry 801 is configured to receive CPCs configured by a secondary base station and/or a master base station.

The determining circuitry 802 is configured to determine whether a number of the CPCs exceeds a second preset threshold.

The direct using circuitry 803 is configured to perform PSCell change based on the CPCs, in response to the number of the CPCs not exceeding the second preset threshold.

The CPC selecting circuitry 804 is configured to: select from the CPCs several CPCs based on a preset rule and perform PSCell change based on the several CPCs selected, in response to the number of the CPCs exceeding the second preset threshold.

A number of CPCs configured by the secondary base station is less than or equal to a configuration threshold, wherein the configuration threshold is a number threshold of CPCs configurable by the secondary base station and is transmitted by the master base station to the secondary base station.

More details of working principles and working modes of the apparatus 80 as shown in FIG. 8 can be referred to related descriptions of the method as shown in FIG. 5 and are not repeated here.

In some embodiments, the apparatus 80 may correspond to a chip with a communication function in a UE, or to a chip with a data processing function, such as an SOC or a baseband chip, or to a chip module including a chip with a communication function in the UE, or to a chip module including a chip with a data processing function, or to the UE.

In some embodiments, each module/unit of each apparatus and product described in the above embodiments may be a software module/unit or a hardware module/unit or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed by a processor, any one of the above methods as shown in FIGS. 3 to 5 is performed. In some embodiments, the storage medium may be a computer readable storage medium, such as including a non-volatile or a non-transitory memory, or include an optical disk, a magnetic disk or a solid disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a base station including the apparatus 60 or the apparatus 70 or including a memory and a processor is provided, wherein the memory has computer instructions stored therein, and when the processor executes the computer instructions, the above method as shown in FIG. 3 or FIG. 4 is performed.

In an embodiment of the present disclosure, a terminal (i.e., a UE) including the apparatus 80 or including a memory and a processor is provided, wherein the memory has computer instructions stored therein, and when the processor executes the computer instructions, the above method as shown in FIG. 5 is performed. The terminal may include but not limited to a mobile phone, a computer or a tablet computer.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A configuration method for Conditional Primary Secondary Cell Group Cell (PSCell) Change (CPC) in dual connectivity, comprising:
   for configuring the CPC for a User Equipment (UE), determining whether a configuration threshold has been received from a master base station, wherein the configuration threshold is a number threshold of CPCs configurable by a secondary base station; and
   determining a number of CPCs configurable by the secondary base station based on the number threshold, in response to the configuration threshold having been received from the master base station, wherein the number of the CPCs configurable by the secondary base station is less than or equal to the configuration threshold.

2. The method according to claim 1, wherein the configuration threshold is the number threshold of CPCs without master base station involvement and/or the number threshold of CPCs with master base station involvement.

3. The method according to claim 1, further comprising:
   receiving the configuration threshold from the master base station through a secondary base station addition request or a secondary base station modification request.

4. The method according to claim 1, wherein following determining whether a configuration threshold has been received from a master base station, the method further comprises:
   determining a maximum number of CPCs configurable by the secondary base station based on a first preset threshold, in response to the configuration threshold having not been received from the master base station.

5. The method according to claim 1, further comprising:
   transmitting a CPC number threshold configuration request or a CPC number threshold modification request to the master base station, to make the master base station transmit the configuration threshold to the secondary base station or update the configuration threshold.

6. The method according to claim 2, further comprising:
   receiving the configuration threshold from the master base station through a secondary base station addition request or a secondary base station modification request.

7. The method according to claim 2, wherein following determining whether a configuration threshold has been received from a master base station, the method further comprises:
   determining a maximum number of CPCs configurable by the secondary base station based on a first preset threshold, in response to the configuration threshold having not been received from the master base station.

8. The method according to claim 2, further comprising:
   transmitting a CPC number threshold configuration request or a CPC number threshold modification request to the master base station, to make the master base station transmit the configuration threshold to the secondary base station or update the configuration threshold.

9. A configuration method for Conditional Primary Secondary Cell Group Cell (PSCell) Change (CPC) in dual connectivity, comprising:
   transmitting a configuration threshold to a secondary base station, to make the secondary base station determine a number of CPCs configurable by the secondary base station based on the configuration threshold while configuring the CPC for a User Equipment (UE);
   wherein the configuration threshold is a number threshold of CPCs configurable by the secondary base station, and the number of the CPCs configurable by the secondary base station is less than or equal to the configuration threshold.

10. The method according to claim 9, wherein the configuration threshold is the number threshold of CPCs without master base station involvement and/or the number threshold of CPCs with master base station involvement.

11. The method according to claim 9, further comprising:
    transmitting the configuration threshold to the secondary base station through a secondary base station addition request or a secondary base station modification request.

12. The method according to claim 9, further comprising:
    receiving a CPC number threshold configuration request or a CPC number threshold modification request from the secondary base station and transmitting the configuration threshold to the secondary base station or updating the configuration threshold.

13. The method according to claim 10, further comprising:
    transmitting the configuration threshold to the secondary base station through a secondary base station addition request or a secondary base station modification request.

14. The method according to claim 10, further comprising:
    receiving a CPC number threshold configuration request or a CPC number threshold modification request from the secondary base station and transmitting the configuration threshold to the secondary base station or updating the configuration threshold.

15. A base station comprising a memory and a processor, wherein the memory stores one or more programs, the one or more programs comprising computer instructions, which, when executed by the processor, cause the processor to:
    transmit a configuration threshold to a secondary base station, to make the secondary base station determine a number of Conditional Primary Secondary Cell Group Cell (PSCell) Changes (CPCs) configurable by the secondary base station based on the configuration threshold while configuring the CPC for a User Equipment (UE);
    wherein the configuration threshold is a number threshold of CPCs configurable by the secondary base station, and the number of the CPCs configurable by the secondary base station is less than or equal to the configuration threshold.

16. The base station according to claim 15, wherein the configuration threshold is the number threshold of CPCs without master base station involvement and/or the number threshold of CPCs with master base station involvement.

17. The base station according to claim 15, wherein the processor is further caused to:

transmit the configuration threshold to the secondary base station through a secondary base station addition request or a secondary base station modification request.

18. The base station according to claim 15, wherein the processor is further caused to:
receive a CPC number threshold configuration request or a CPC number threshold modification request from the secondary base station and transmit the configuration threshold to the secondary base station or updating the configuration threshold.

19. The base station according to claim 16, wherein the processor is further caused to:
transmit the configuration threshold to the secondary base station through a secondary base station addition request or a secondary base station modification request.

20. The base station according to claim 16, wherein the processor is further caused to:
receive a CPC number threshold configuration request or a CPC number threshold modification request from the secondary base station and transmit the configuration threshold to the secondary base station or updating the configuration threshold.

* * * * *